Figure 1:
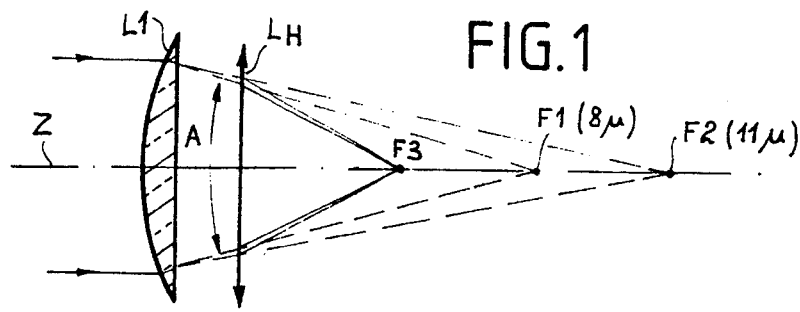

United States Patent [19]
Migozzi

[11] Patent Number: 5,537,245
[45] Date of Patent: Jul. 16, 1996

[54] INFRA-RED DIFFRACTIVE OPTICS APPLICABLE TO A LASER TARGET DESIGNATION SYSTEM

[75] Inventor: Jean B. Migozzi, Orsay, France

[73] Assignee: Thomson-C.S.F., Paris, France

[21] Appl. No.: 220,619

[22] Filed: Jul. 6, 1988

[30] Foreign Application Priority Data

Jul. 28, 1987 [FR] France .................................. 8710691

[51] Int. Cl.$^6$ ............................ G02C 7/02; G03H 1/22; G02B 5/32
[52] U.S. Cl. ................ 359/356; 359/16; 359/19
[58] Field of Search ................... 350/1.4, 3.7, 3.72, 350/3.73, 3.84; 359/16, 19, 356

[56] References Cited

U.S. PATENT DOCUMENTS

| | | | |
|---|---|---|---|
| 4,364,627 | 12/1982 | Haines | 350/3.83 |
| 4,376,889 | 3/1983 | Swift | 350/347 |
| 4,447,111 | 5/1984 | Leif | 350/3.7 |
| 4,455,061 | 6/1984 | Case | 350/3.75 |
| 4,549,802 | 10/1985 | Ohtka | 354/407 |
| 4,550,973 | 11/1985 | Hufriegel | 350/3.72 |
| 4,641,934 | 2/1987 | Freeman | 350/3.72 |
| 4,697,866 | 10/1987 | Howard | 350/1.4 |
| 4,701,005 | 10/1987 | Noguchi | 350/3.72 |
| 4,714,307 | 12/1987 | Palmer | 350/1.4 |
| 4,850,662 | 7/1989 | Chen | 350/3.72 |

OTHER PUBLICATIONS

Lee, W.; "Techniques For Recording . . . Infrared Wavelengths"; Opt. Communications, vol. 34, No. 1, pp. 29–31, Jul. 1980.

Guizhard, R. C.; "Plastic Lens . . . Control"; Central Engineering, vol. 29, No. 3, pp. 134–142, Feb. 1982.

*Primary Examiner*—Nelson Moskowitz
*Attorney, Agent, or Firm*—Cushman, Darby & Cushman

[57] ABSTRACT

The infra-red diffractive optical lens will remedy chromatism faults and offer excellent compactness; in addition, it does not call for a cooling device. It comprises a first convergent lens made of a material corresponding to the operational infra-red band width considered and a second convergent lens formed by a surface hologram. This hologram is obtained by accurate machining of one of the diopters of the first convergent lens according to machining data optimized by digital calculations. The first lens is preferably made of zinc sulfide. This system can operate simultaneously in the 8 to 12 microns infra-red band and the 1.06 microns laser channel.

21 Claims, 2 Drawing Sheets

INFRA-RED DIFFRACTIVE OPTICS APPLICABLE TO A LASER TARGET DESIGNATION SYSTEM

This invention concerns an optical lens, essentially designed for work under infra-red radiation conditions but also likely to be able to transmit nearby visible radiation.

The use of the invention is more specifically considered for a laser target designation system equipped with a thermal camera. For this application, two optical paths are used, an infra-red path which may be located between eight and twelve microns (abbreviation for micrometer) and a laser path, for instance at 1.06 microns i.e. in the near infra-red range.

A thermal camera, which is excessively bulky, cannot be housed in the adjustable head of the target designation system. It is necessary to use separate optics for each path, leading to problems of harmonization during rotation because of the high level of accuracy needed. In addition, the infra-red path optical lens is generally made of germanium which poses problems of cooling with a subsequent risk of lens pollution. To achieve an afocal infra-red optical unit, it is necessary to have an initial short focal length lens i.e. very wide opening at the entry. The high index germanium material, approximately four, makes it possible to produce this type of lens but it does involve several drawbacks. It defocuses with temperature i.e. its index varies with temperature and it absorbs visible radiation because it is limited to the wavelength it encounters above two microns. This means that it is not applicable for the processing of the second optical path in the application considered here.

To remedy some of the drawbacks mentioned above, in particular that of cooling, the convergent germanium inlet lens is replaced by lenses of another material, in particular of zinc selenide and zinc sulfide. The optical lens could comprise, for instance a doublet incorporating a convergent open lens of zinc selenide followed by a divergent zinc sulfide lens. Indeed, these lens produce chromatism which also produces a greater deviation for shorter wavelengths of around eight microns than for wavelengths of around twelve microns in the infra-red band in question. The coupling of a divergent lens with a very open entry convergent lens partly overcomes this drawback but, conversely, considerably extends the pull, i.e. the focal length of the overall assembly with respect to the germanium solution. This increased focal distance is incompatible with some applications, including the application considered for a target designation system in which compactness requirements are very severe. The goal of the invention is to overcome the aforementioned drawbacks by producing a diffractive large aperture infra-red lens which is free of chromatism faults, permits high compactness and which does not require a cooling device. According to the invention, an infra-red diffractive lens is produced, comprising two convergent lens, each corresponding to the operating wavelength considered in the infra-red field, the first made of a material corresponding to this wavelength band and the second formed by a surface hologram.

According to another characteristic of the invention, the surface hologram is obtained by machining one of the diopters of the first convergent lens according to data optimized by means of digital calculation.

Figure 2:
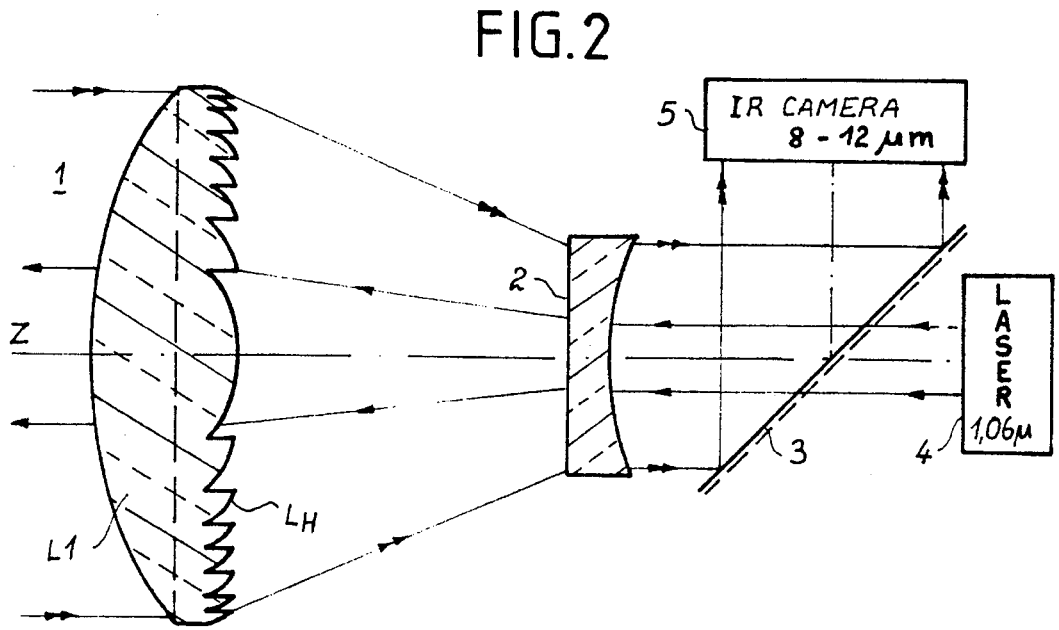
Figure 3:
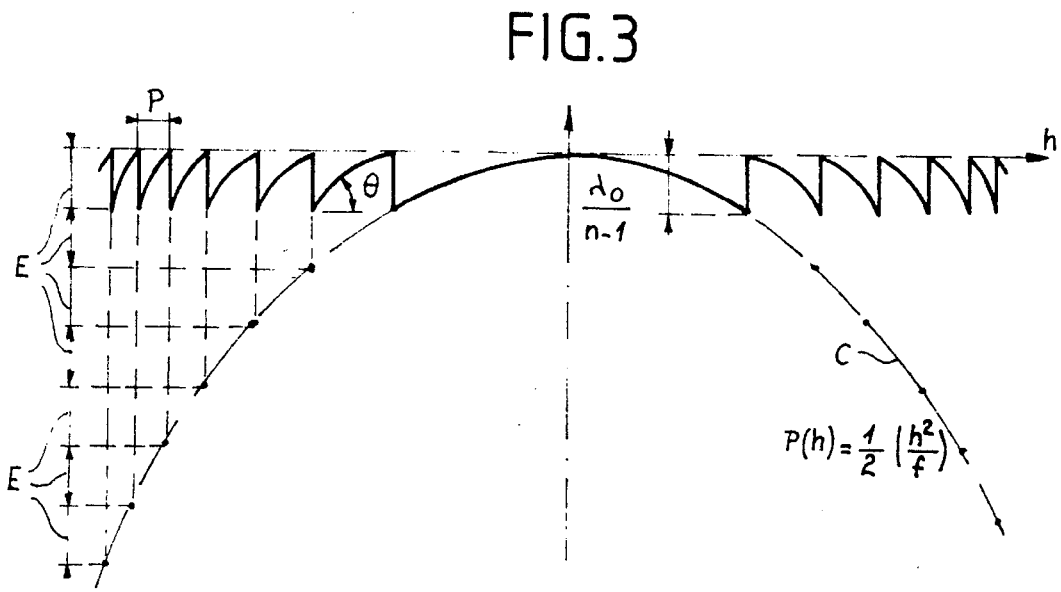
Figure 4:
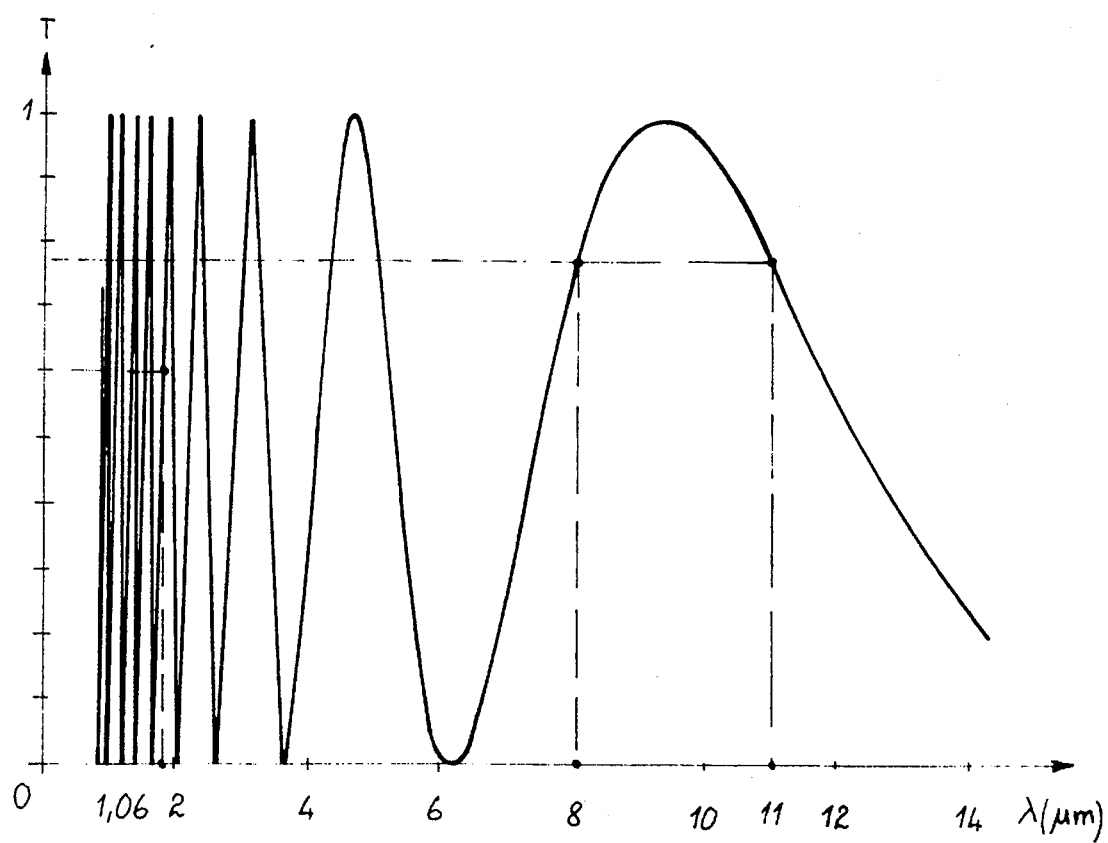

The particularities and advantages of the invention will appear in the description which follows as an example, and as depicted in the attached figures which represent:

FIG. 1, a diagram of the diffractive optical lens in accordance with the invention;

FIG. 2, a diagram showing in greater detail the aspect of the diffractive optical lens and its set up with other elements within the framework of application in a laser target designation system;

FIG. 3, a diagram relative to the production of a surface hologram;

FIG. 4, a transmission response curve for the hologram of FIG. 3 as a function of the wavelength.

If we refer to the diagram of FIG. 1, the diffractive lens produced according to the invention comprises an initial convergent lens L1 of a material corresponding to the operating infra-red wavelength band considered, and a second convergent lens LH comprising a surface hologram. The optical materials deviate the eight microns more than the eleven microns whereas the hologram deviates more by substantial wavelength diffraction and therefore, in the case of the band in question, the eleven microns more than the eight microns. The dotted representation of the rays at point F corresponds to radiation of eight microns deviated by lens element L1 alone and at F2, to the eleven micron radiation deviated by lens L1 alone.

The coupling of convergent lens L1 with the convergent holographic lens LH is determined to bring all the rays to the same point F3. The lens has a great aperture represented by the wide angle A. Lens L1 as depicted is preferably plane-convex because the obtainment of a surface hologram on the plane surface of lens L1 is easier to obtain than on the curved surface. L1 is easier to produce than on a curved surface. Lens L1 can be zinc sulfide (ZnS) lens because this material is more dispersive than zinc selenide (ZnSe). The face considered for forming the hologram can be any of the diopters of lens L1 as well as the diopter placed downstream as that considered upstream which receives a radiation.

The surface hologram more visible on FIGS. 2 and 3, in the axial sectional views according to optical axis Z, is more or less in the shape of a Fresnel lens. For information, the pitch of the edge fringes could be 0.5 mm and the diameter of the central zone could be 9 mm for a 40 mm lens diameter. Surface machining can be carried out with very high accuracy using a MOORE machine. The machining data of the diopter are calculated by an auxiliary computer in order to produce a digital hologram, therefore optimized, corresponding to the scheduled conditions of utilization, particularly from the standpoint of the spectral bands to be processed. The surface hologram, also the called "blazed" network, is comparable to a network of antennas scanning in the electromagnetic domain. The variable pitch P between the successive circular profiles results in the deviation of the beam to the desired angle. Inclination $\phi$, variable for the different profiles, suppresses the side lobes to obtain first order diffraction. Efficiency of 100% is obtained for an average wavelength in the chosen operating range. For instance, for range eight to eleven microns, efficiency can be up to 97.4% and for and extension of eight to twelve microns, it remains at around 95.8%. Thickness E of the hologram profile can be, in this example, on the order of seven microns with a pitch P varying between 0.2 and 6.5 mm (13 mm diameter to center). As already mentioned, the particular profile, machined with a high precision machine such as the MOORE, is calculated according to the digital holographic principle which consists in obtaining a mathematical expression with parameter coefficient values variable to represent the optical formula to be obtained. Depending on the choice of the parameters, the computer calculates the abberations presented by the optical formula. Then, the parameter values are modified and, consecutively, the output formula, in such a way as to decrease the aberrations by deforming the wave front. In this way, gradually, by digital calculations, we obtain an optimized optical formula with minimized or very low aberrations. These calculations are made taking account of the total desired field for the system and, finally, make it possible to define a diffractive infrared holographic optic which is achromatic, with a large aperture, and which does not require cooling while offering excellent compactness.

FIG. 2 shows an assembly within the framework of the application considered, including an afocal optical system comprising optic 1 combining elements L1 and LH of FIG. 1 and optic 2 comprising a divergent lens. This afocal assembly will reproduce parallel radiation. It is completed by a dichroic mirror 3 which allows radiation to pass at 1.06 microns from a laser illuminator 4 and which reflects the reception of the infra-red radiation included in the eight-twelve micron band toward an infra-red camera 5. It is evident that if the laser radiation, as indicated, is of a sufficiently small diameter, it will only attain the central part of the hologram which will behave like a simple lens. Conversely, if the laser radiation has a larger diameter and covers other parts of holographic lens LH, it will be necessary to take account of the hologram transmission response curve (FIG. 4) and to work on the infra-red band by modifying its limits so that for 1.06 microns we are near the peak of a side lobe. The modification of the infra-red band parameter will offset the response curve along the abscissa axis until the desired result is obtained. This curve is a sinus $K/\lambda$; the ordinate values represent transmission T.

The decreased infra-red operating pass band leads to increased machining accuracy.

For instance, if we consider an overall focal length of 100 mm with a lens element L1 having diameter 40 mm, the focal length of the lens, made of zinc sulfide, will be 110 mm so that it will be necessary to produce a hologram having a focal length of approximately 1000 mm with an equivalent refraction index about 2.5. The machining accuracy required for this system are ±0.03 mm laterally and ±0.5 microns in depth. The holographic lens LH will have a profile as defined by the relation of the circle $h^2=x^2+y^2$ and by the phase function $P(h)=(h^2/2f)$ modular $(\lambda o/n-1)$ in which f=1000 mm, $\lambda o$ is the average wavelength (for instance 9.26 microns for the eight to eleven micron band) and n is the index of zinc sulfide which is on the order of 2.33.

This results in the profile indicated in FIG. 3 in which the thickness is given by $\lambda o/n-1$ and is of the order of seven microns and in which curve C as shown equals $(h^2/2f)$. The latter term, representing the phase function, is determined to correct a case of pure chromatism. In practice, the function is calculated with more complex terms which serve to compensate also for other aberrations by a similar process to that used for digital holography.

I claim:

1. An a focal infrared diffractive optical lens system, comprising:
   a convergent refractive lens of a type that has chromatism faults therein; and
   a holographic convergent lens formed by a surface hologram, and formed to correct said chromatism faults of the first lens, to form a lens system free of chromatism faults.
   means for forming an optical system for separating an infrared reception path from a transmission laser path.

2. An infrared diffractive optical lens according to claim 1 wherein the shape of said surface hologram is obtained by machining one of the diopters of the first convergent lens according to machining data, in order to correct chromatism faults of the first lens.

3. An infrared diffractive optical lens according to claim 1 wherein the first lens is of zinc sulfide.

4. An infrared diffractive optical lens according to claim 1 wherein the first lens is of zinc selenide.

5. An infrared diffractive optical lens according to claim 2 wherein the first lens is of zinc sulfide.

6. An infrared diffractive optical lens according to claim 2 wherein the first lens is of zinc selenide.

7. An infrared diffractive optical lens according to claim 1 said surface hologram is generated in the shape of a Fresnel lens.

8. An infrared diffractive optical lens according to claim 2 wherein said surface hologram is generated in the shape of a Fresnel lens.

9. An infrared diffractive optical lens according to claim 7, wherein the shape of the hologram is defined by relations $h^2=x^2+y^2$ and by phase function $P(h)=(h^2/2f)$ modulo $(\lambda o/n-1)$ in which f represents the focal length of said second holographic lens, $\lambda o$ the average wavelength, n the index of the material forming the first lens, $\lambda o/n-1$ the thickness of the hologram, and $(h^2/2f)$ the phase function.

10. An infrared diffractive optical lens according to claim 8, wherein the shape of the hologram is defined by relations $h^2=x^2+y^2$ and by phase function $P(h)=(h^2/2f)$ modulo $(\lambda o/n-1)$ in which f represents the focal length of said second holographic lens, $\lambda o$ the average wavelength, n the index of the material forming the first lens, $\lambda o/n-1$ the thickness of the hologram, and $(h^2/2f)$ the phase function.

11. A system, comprising:
    an infrared diffractive optical lens, including:
      a convergent refractive lens; and
      a holographic convergent lens formed by a surface hologram having a shape such that it corrects chromatism faults of the convergent lens;
    a divergent lens; and
    a dichroic mirror, said divergent lens being combined with said infrared diffractive optical lens and said dichroic mirror to form an afocal optical system to separate an infrared reception path from a transmission laser path.

12. A system according to claim 11 wherein the shape of said surface hologram is obtained by machining one of the diopters of the first convergent lens according to machining data in order to correct chromatism faults of the first lens.

13. A system according to claim 11, wherein the laser path is in the near infrared field, at around 1.06 micron.

14. A system according to claim 11, wherein the first lens is of zinc sulfide.

15. A lens according to claim 11, wherein the first lens is of zinc selenide.

16. A system according to claim 12, wherein the first lens is of zinc sulfide.

17. A lens according to claim 12, wherein the first lens is of zinc selenide.

18. A lens according to claim 11, wherein the surface hologram is generated in the shape of a Fresnel lens.

19. A lens according to claim 12, wherein the surface hologram is generated in the shape of a Fresnel lens.

20. A lens according to claim 18, wherein the shape of the holographic lens is defined by the relations $h^2=x^2+y^2$ and by phase functions $P(h)=(h^2/2f)$ Modulo $\lambda o/n-1)$ in which f represents the focal length of said second holographic lens, $\lambda o$ the average wavelength, n the material index forming the first lens, $\lambda o/n-1$ the hologram thickness and $(h^2/2f)$ the phase function.

21. A lens according to claim 19, wherein the shape of the holographic lens is defined by the relations $h^2=x^2+y^2$ and by phase functions $P(h)=(h^2/2f)$ Modulo $\lambda o/n-1)$ in which f represents the focal length of said second holographic lens, $\lambda o$ the average wavelength, n the material index forming the first lens, $\lambda o/n-1$ the hologram thickness and $(h^2/2f)$ the phase function.

* * * * *